INVENTOR
DAG A. B. HARTMAN

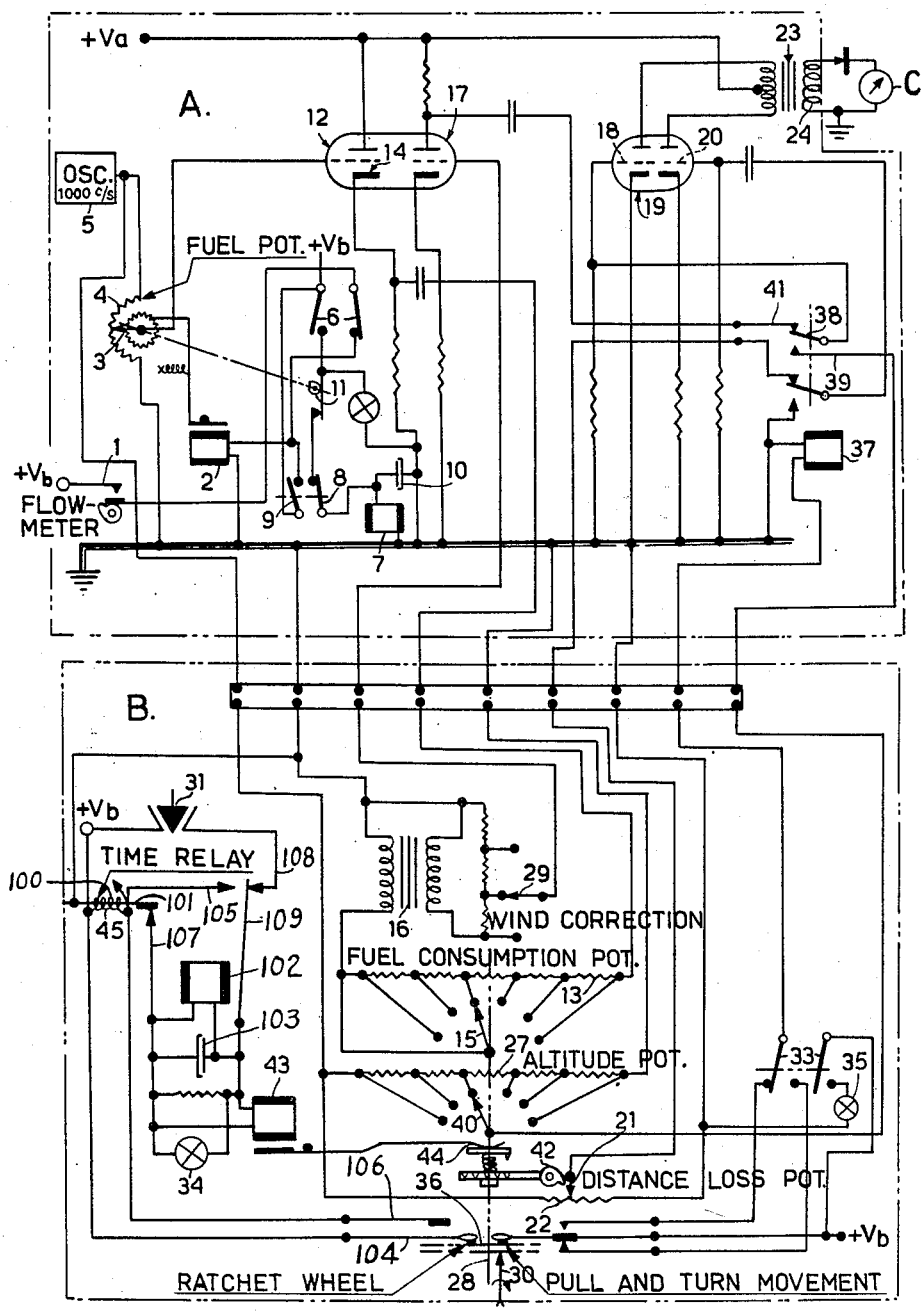

March 5, 1957 D. HARTMAN 2,783,940
APPARATUS FOR COMPUTING THE DISTANCE AN AIRPLANE CAN
COVER BY THE FUEL AVAILABLE IN THE FUEL TANKS
Filed Aug. 21, 1953 5 Sheets-Sheet 3
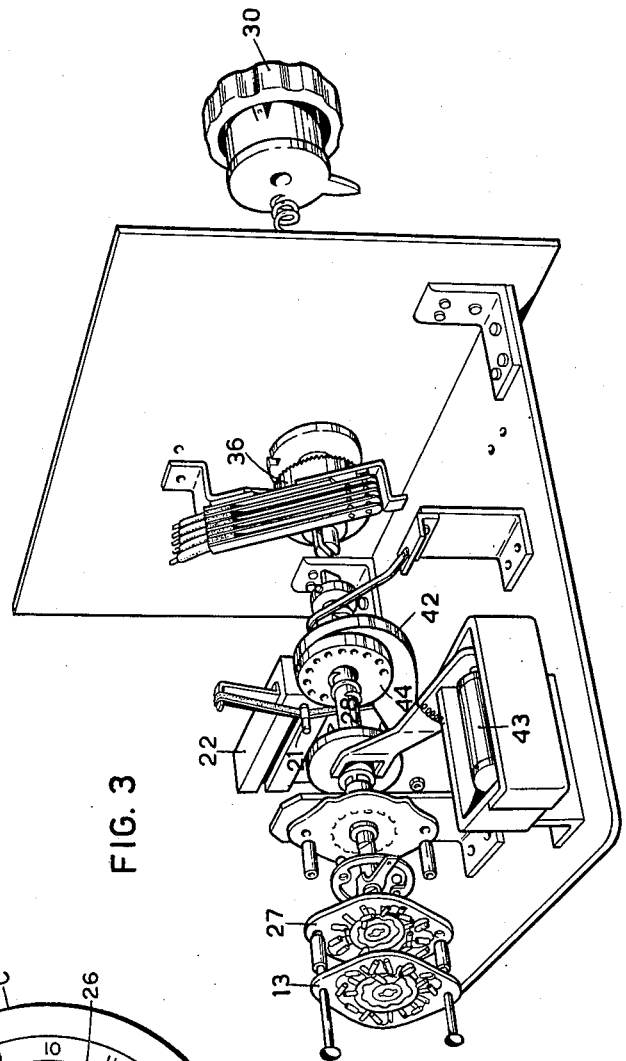
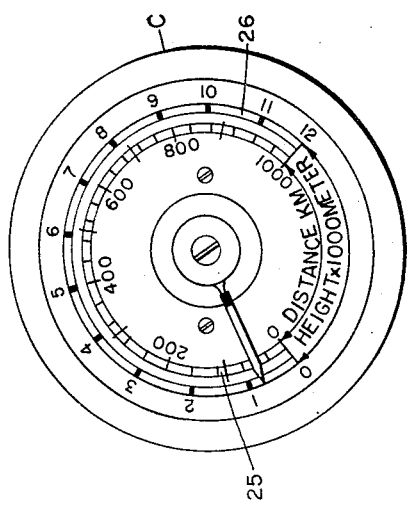
INVENTOR
DAG A.B. HARTMAN

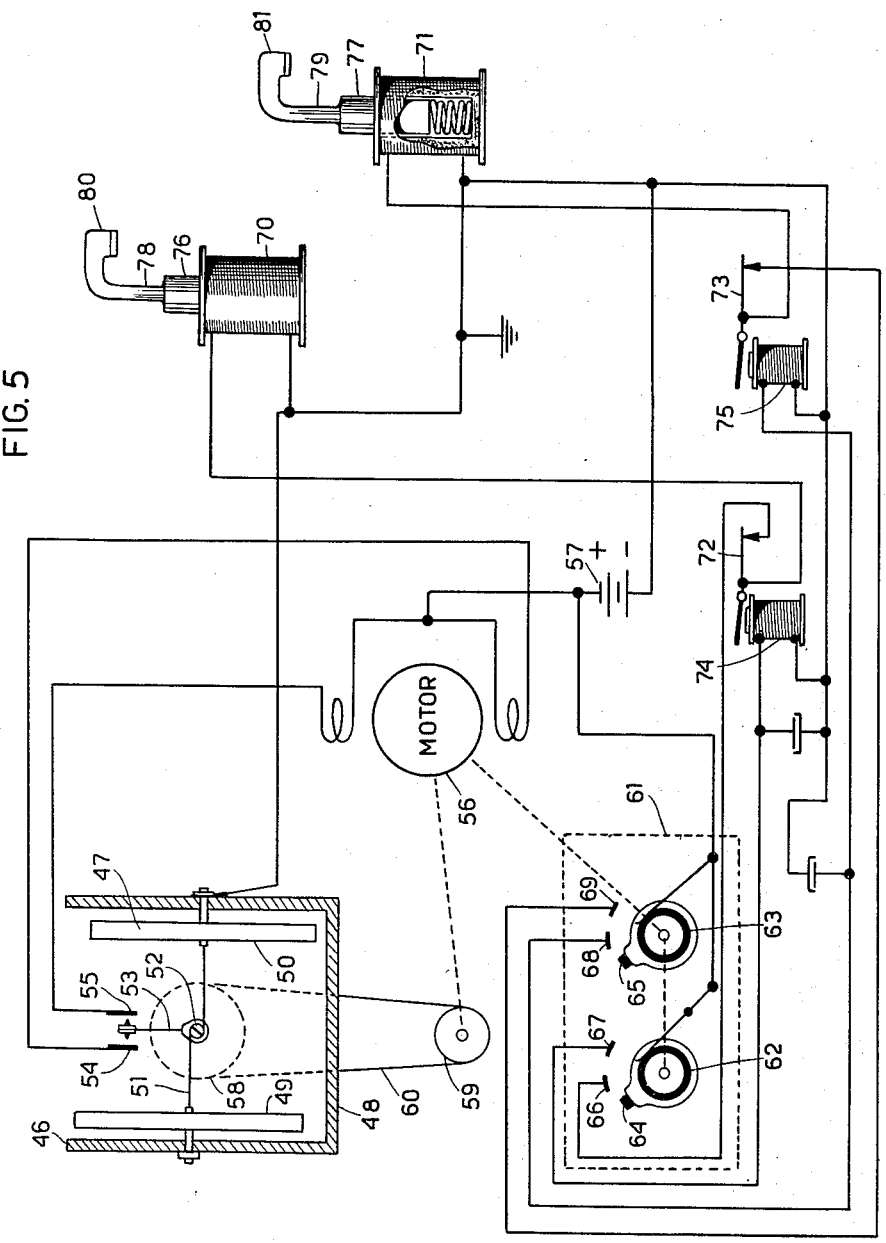

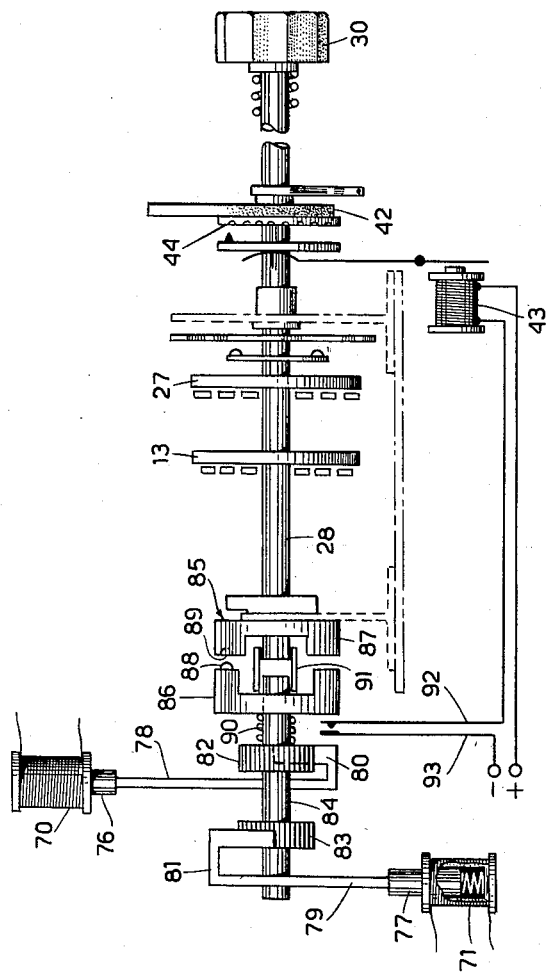

United States Patent Office 2,783,940
Patented Mar. 5, 1957

2,783,940

APPARATUS FOR COMPUTING THE DISTANCE AN AIRPLANE CAN COVER BY THE FUEL AVAILABLE IN THE FUEL TANKS

Dag Hartman, Linkoping, Sweden, assignor to Svenska Aeroplan Aktiebolaget, Linkoping, Sweden, a corporation of Sweden Application August 21, 1953, Serial No. 375,803

7 Claims. (Cl. 235—61)

The present invention relates to an apparatus for computing the distance an airplane can cover by the fuel available in the fuel tanks of the airplane.

Primarily the invention consists therein that a voltage varying in dependence of the capacity of the fuel quantity is adapted to be imposed upon means indicating the fuel consumption of the airplane for transforming the voltage into a voltage dependent on the ratio between the fuel quantity and the fuel consumption.

In embodying the apparatus according to the invention a fuel gauge directly connected to the fuel system may be used for measuring the fuel consumption of the airplane. If the fuel consumption is measured by means of a fuel gauge an indication of the flying range on the instrument will be proper only in continued flying in the state the airplane had at the moment the distance was read on the instrument.

If before or during flight the pilot wants information of the distance which can be flown on the fuel available in carrying out the flight in a predetermined way the fuel consumption must be calculated on the conditions which will influence the flight if this occurs in the way planned. The following description will give an explanation of the different relationships between fuel consumption and factors influencing the fuel consumption such as flying speed, altitude, altitude changes, atmospheric conditions, etc. and also different ways of flying based upon these relations in order to reach the longest distance possible on the fuel available.

When investigating the fuel consumption of an airplane in different states of flight at different altitudes it is found that the fuel consumption of the airplane is minimum at one indicated flying speed at one altitude and minimum at another flying speed at another altitude. When the fuel consumption is minimum at a certain altitude the distance the airplane can fly on a given fuel quantity at this altitude is evidently maximum. However, the relation between fuel consumption and flying range on one hand and flying speed and altitude on the other hand exists only when certain atmospheric conditions prevail. Thus it appears that the pilot has to keep a somewhat different throttle opening on one occasion to attain equal indicated speed at the same altitude. In determining the flying speed at an altitude it is thus necessary to take into consideration prevailing atmospheric conditions for attaining economic fuel consumption. Evidently the pilot can be informed in one way or another of which flying speed as a function of the condition of the atmosphere is the most suitable one at a given altitude, but rather great difficulties arise hereby. Another more advantageous solution of the problem from a navigation point of view could be obtained by applying among others air temperature responsive correction means to the apparatus, but this would in such a case complicate the instrument considerably.

Theoretically it can be shown that the relation between fuel consumption and flying speed at a predetermined pressure height and gross weight of the airplane is a simple function of the Mach-number independent of the atmospheric condition, whereby also the relation between economic fuel consumption and flying speed for the predetermined pressure height and gross weight of the airplane also is a simple function of the Mach-number. In a preferred embodiment of the invention this relationship has been utilized by the use of the Mach-number gauge of the airplane as airspeed indicator. Thus if the pilot flies in accordance with the Mach-number corresponding to the predetermined pressure height, the airplane will be flown with equal throttle opening independent of the condition of the atmosphere.

For a particular type of airplane the economic fuel consumption at different altitudes can be established by tests and the Mach-number having relation to economic fuel consumption at respective altitude can be calculated. If the economic fuel consumption for the particular type of airplane is thus known it is possible to calculate the maximum distance an airplane of this type can cover by the fuel available according to the equation.

$$S = \frac{Q_r}{f_H}$$

where $S$ = maximum flying distance at existing altitude, e. g. miles $Q_r$ = available fuel quantity, e. g. gallons $f_H$ = economic fuel consumption at existing altitude in gallons/miles An apparatus can be construed having means for receiving information of available fuel quantity in the fuel tanks of the airplane and the normal economic fuel consumption to present to the pilot the maximum flying distance, which can be attained if the flying speed, i. e. Mach-number, is chosen in such a way that the fuel consumption of the engine is minimum.

Tests of airplane fuel consumption at different altitudes prove at any rate that the economic fuel consumption decreases with increasing altitude. Thus to get as far as possible the pilot ought to fly as high as possible. However, if the airplane is at one altitude and the pilot wants to climb to another higher altitude a certain amount of fuel is consumed only for elevating the airplane to this new altitude. During climbing the airplane of course moves a distance forward but this will be less than the distance the airplane would have been able to cover by the corresponding fuel quantity at the higher altitude. The loss of distance the airplane thus suffers when climbing compared with level flight at the higher altitude can be calculated according to the equation $$\Delta S_c = \frac{Q_1}{f_{H_1}} - k_1 \Delta H$$

where $\Delta S_c$ = the loss of distance the airplane suffers in climbing to the higher altitude compared with level flight at this higher altitude $Q_1$ = the fuel quantity consumed during the climbing $f_{H_1}$ = the economic fuel consumption of the airplane at the higher altitude $k_1$ = cotan of the climb angle $\Delta H$ = the altitude difference In the type of airplane concerned the loss of distance may thus be calculated for climbings carried out in a predetermined way within different altitude intervals. An instrument being able to calculate the maximum flying range of the airplane also in view of the climbings of the plane has thus to be arranged in such a manner that it can compute and in advance determine the maximum flying ranges of the airplane even in changes of the altitude of flight. It will thus be seen that the loss of distance above discussed can be considered as a loss of the distance the airplane can cover in flying at the higher altitude. Thus the distance the instrument is to compute will be determined by the equation:

$$S=\frac{Q_r}{f_{H_1}}-\Delta S_c$$

where $Q_r$ = the fuel quantity available in the fuel tanks of the airplane at the moment of computation
$f_H$ = the economic fuel consumption of the airplane at the higher altitude
$\Delta S_c$ = the loss of distance the airplane suffers in climbing to the higher altitude compared with level flight at this higher altitude When calculating the losses of distance within fixed intervals it will be found that these losses are not of the same magnitude if the climbing is started at different altitudes. Thus the loss of distance will be greater if the airplane climbs from e. g. 27,000 feet to 30,000 feet than if it climbs from e. g. 7,000 feet to 10,000 feet. By bringing an average value of the loss of distance within each altitude interval into the instrument the fault brought into the instrument in view of varying altitudes may generally be neglected.

In the same way corrections for the gain of distance the airplane obtains when descending to a lower altitude than the existing one can be calculated and brought into the instrument. The general equation which is applicable in all cases will be as follows:

$$S=\frac{Q_r}{f_{H_1}}-\Delta S_c+\Delta S_d$$

where $S_d$ = the gain of distance the airplane obtains when descending to a lower altitude in a predetermined way compared with continued level flight at the higher altitude Further information about possible flying range may be of use to the pilot. Among others it may be of value to the pilot if, in a simple way he can be informed of the longest possible flying range the airplane can cover on available fuel quantity including the loss of distance the airplane suffers owing to a change of altitude and in such a case also the altitude which yields the longest possible flying range.

Mathematically expressed this means that maximum is to be sought for the function $$S=\frac{Q_r}{f_H}-\Delta S$$

where $Q_r$ is regarded as a parameter.

In looking for the longest possible flying distance of a particular type of airplane it will be found that as long as there are comparatively large fuel quantities in the tanks there exists practically no useful maximum flying range within the possible altitude range of the aircraft but when less fuel quantities are in the tanks the symbolized function will get marked maxima which are of different magnitude depending on the altitude at which the climbing is started.

From the foregoing it will be seen that the principal object of the invention is to provide in an airplane an apparatus for computing the ratio between fuel quantity and fuel consumption and thereby approximately the distance the airplane can cover by the fuel available in the fuel tanks.

Another object of the invention is to provide in such an apparatus a computing device to compute the ratio between fuel quantity and economic fuel consumption as a function of altitude, whereby the maximum flying range can be calculated at different altitudes.

Another object of the invention resides in the provision of a correction device for correcting the ratio between fuel quantity and economic fuel consumption with regard to the loss or gain of flying range, which is obtained if the airplane is to be moved in a predetermined way to an altitude differing from existing altitude, whereby the flying range can be calculated from existing altitude for flying at any altitude.

A further object of the invention is to provide an apparatus as above wherein the above mentioned computing device is calculated on the Mach-number which corresponds to economic fuel consumption of the airplane at varying altitudes, whereby the calculated flying distance will be true and independent of changes in atmosphere conditions, the assumption being that the airplane is flown at speeds corresponding to predetermined Mach-number.

A further object resides in the provision of wind correction means for correcting the flying range with respect to the velocity and the direction of prevailing wind.

A further object is to provide in the apparatus manually settable means for searching the longest possible flying range and the altitude which correspondse to said flying range.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The invention will now be described with reference to the accompanying drawings, illustrating an exemplified embodiment of the apparatus according to the invention.

Fig. 2 shows more in detail a wiring diagram of the apparatus.

Fig. 3 is a perspective exploded layout of reversing switch devices included in the apparatus.

Fig. 4 is a front view of the indicator of the apparatus.

Fig. 5 is a diagrammatic view of an adjustment mechanism by means of which the setting of the apparatus for existing flying altitude can be automatically controlled.

Fig. 6 is a plan view showing the relative arrangement of the devices shown in Fig. 3 and Fig. 5.

Figure 1:
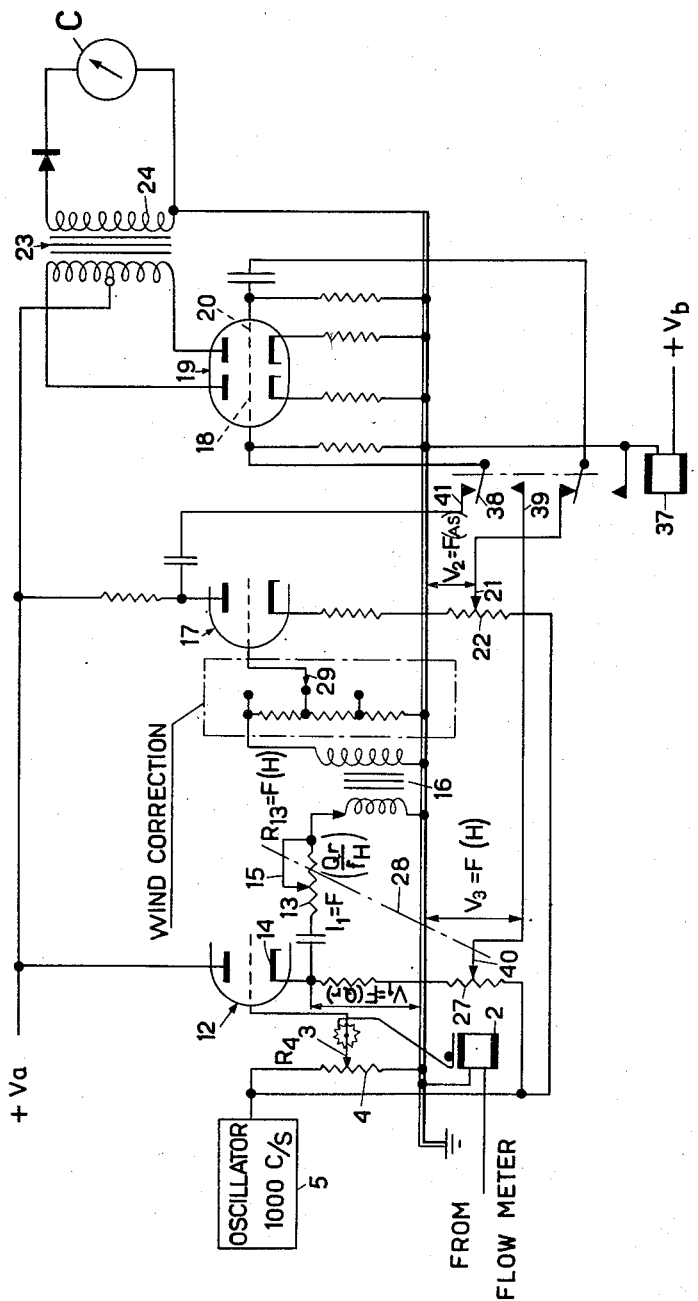
Fig. 1 shows diagrammatically the principle of the apparatus.

The apparatus shown in the drawings comprises generally an electronic unit A, a control apparatus B and an indicator C.

In the embodiment shown a fuel flow meter is used for measuring the fuel quantity, having a pulse transmitter 1 electrically connected to a stepping relay 2 included in the electronic unit A and arranged to rotate step by step the sliding contact arm 3 of a potentiometer 4. The potentiometer 4 is fed by an alternating voltage having a constant amplitude generated by an oscillator 5. The position of the sliding contact arm 3 on the potentiometer path is thus a measure of remaining fuel in the fuel tanks of the airplane. When refueling the airplane after flight the sliding contact arm should thus be returned to that end of the potentiometer path which is connected to the oscillator 5. In the embodiment shown the restoring of the sliding contact arm 3 occurs automatically by means of a switch 6 inserted into the fuel filler cover of the airplane, which switch is reversed in unscrewing the cover, whereby a relay 7 through a relay tongue 8 receives an electric voltage. When the relay 7 attracts the relay tongue 8 and another relay tongue 9 the voltage to the relay is cut off, but the stepping relay 2 is then actuated by a voltage, which lasts as long as a condenser 10 is capable of keeping the relay 7 in depressed position. As soon as the condenser 10 is discharged the relay 2 will be dead. The relay 7 will thus carry out an automatic step movement and for each closing of the circuit the relay 2 will get a current impulse. The potentiometer 4 is arranged in such a way that the sliding contact arm 3 rotates in the same manner as the minute hand of a watch, i. e. the potentiometer arm 3 moves always in the same direction. When the relay 2 controlled by the relay 7 again starts creating step movements the potentiometer arm 3 is rotated until the arm is moved close to that part of the potentiometer path 4, which is connected to the oscillator 5. When the potentiometer arm 3 is in this position it cuts off the voltage to the relay 7 by means of a break roller 11 mechanically connected to the arm 3 and the step movement ceases. In screwing on the fuel filler cover the switch 6 is reversed and the switch arrangement will then function in such a way that the stepping relay 2 can get the step impulses from the impulse transmitter 1 of the flow meter when the engine of the airplane is started.

From the movable contact arm 3 of the potentiometer the output voltage is fed into an electron valve 12, the object of which primarily is to serve as an impedance differentiator and deliver over its output circuit an alternating voltage directed proportionally to the voltage existing between the contact arm 3 and ground of the potentiometer 4. In fact, this alternating voltage has the same absolute value as the first mentioned output voltage. A potentiometer 13 is at one end connected to the cathode 14 of the electron valve 12 and is at the other end connected to its sliding contact arm 15 and to the primary winding of a transformer 16. The potentiometer 13 is adjustable in steps and the resistance value of the potentiometer in the different positions of adjustment is a function of the fuel consumption of the airplane. The alternating current flowing through the primary winding of the transformer 16 is thus dependent on the position of the arm 3 of the potentiometer 4 on one hand and on the position of the arm 15 of the potentiometer 13 on the other hand. The intensity of the current will consequently be according to Ohm's law.

$$I = \frac{V_{R_4}}{R_{13}} = \frac{F(Q_r)}{F(f_H)}$$

where $I$ = the current flowing through the primary winding of the transformer 16
$V_{R_4}$ = the voltage between the sliding contact arm 3 of the potentiometer 4 and ground
$R_{13}$ = the setting of the potentiometer 13

The primary current is transformed up in the transformer 16, amplified in an amplifier valve 17 and fed into one control grid 18 of a double triode 19, the other control grid 20 of which is connected to the sliding contact arm 21 of the potentiometer 22. In the anode circuit of the double triode 19 is a transformer 23, the primary winding 24 of which is connected to the indicator C having a dial with two scales 25 and 26, one scale 25 of which is graduated in distance (miles) and the other scale is graduated in altitude (feet). The potentiometer 22 is fed by alternating current from the oscillator 5 and is so designated that when the potentiometer is in adjusted position it delivers an alternating voltage, the magnitude of which is a function of the loss of distance the airplane suffers when climbing to another altitude. The alternating voltage of the potentiometer 22 has such a phase relative to the voltage fed into the control grid 18 of the double triode 19 that the two voltages can be subtracted from one another in the transformer 23. The subtraction occurs in that the voltages through the grid 18 of the triode 19 are converted into currents in the transformer 23 with such a direction that they neutralize each other to an extent corresponding to the magnitude of the first mentioned voltages.

In addition to the two potentiometers 13 and 22 a third potentiometer 27 is inserted into the control apparatus B of the instrument. All of these potentiometers are connected to the same shaft 28, but only the potentiometers 13 and 27 follow each other continuously. On the front side of the control apparatus are two control knobs, a smaller one actuating a switch 29 and a larger one 30, a push button 31, a switch 33 and two signal lamps 34 and 35. By means of the larger control knob 30 the shaft 28 can be rotated only after the control knob 30 has been pushed in, because the knob in non-pushed-in position is locked by a ratchet wheel 36. When the control knob 30 is pushed in, the control grid 18 of the double triode 19 is connected by means of the ratchet wheel 36, a relay 37 and relay tongues 38 and 39 to the sliding contact arm 40 of the potentiometer 27. This latter is fed by a constant alternating voltage from the oscillator 5 and the magnitude of the voltage is chosen in such a way that fully turned on potentiometer corresponds to full deflection of the indicator C. In turning the control knob 30 the two potentiometers 13 and 27 are evidently adjusted. The potentiometer 27 is thereby so adjusted that its value will be a function of the altitude desired, while the value of the other potentiometer will be a function of the economic fuel consumption of the airplane at the adjusted altitude. The pilot reads during the setting on the altitude scale 26 of the indicator C and the control knob 30 is turned until desired altitude is read off. In releasing the control knob this will return to blocked position and by means of the relay tongue 38 and a relay tongue 41 the control grid 18 of the double triode 19 will be connected to the amplifier valve 17, and the possible flying range can now be read on the distance scale 25 of the indicator C at the adjusted altitude if flying with economic fuel consumption, i. e. the Mach-number which corresponds to economic fuel consumption.

If the airplane is at one altitude and the pilot intends to climb to another higher altitude and thereby wants to know how far he can reach if the loss of distance the airplane suffers during the climbing is taken into consideration, the push button 31 is pushed in, whereupon the control knob 30 is turned so that the desired new altitude is read on the altitude scale 26 of the indicator C. When the control knob 30 is released the pilot reads on the distance scale 25 of the indicator C how far he can reach. By pushing in the button 31 the sliding contact of the potentiometer 22 is mechanically connected to the rotatable shaft 28 through a curved disc 42, the shape of which is calculated from the equations given in column 2, line 50 to column 3, line 16, so that the potentiometer follows the turning movement of the shaft 28. The push button 31 energizes a relay 43 which in turn actuates a switch device 44 the movable part of which is non-rotatably but slidably mounted on the shaft 28. In energizing the relay 43 the movable part of the switch is moved into engagement with the curved disc 42 which thereby is locked to the shaft 28 and when turning the shaft the potentiometer 22 is adjusted, whereby a voltage proportional to the loss of distance during the planned climbing is delivered from the sliding arm 21 of the potentiometer 22. During the turning movement the potentiometer 13 is also adjusted so that its output value will be proportional to the fuel consumption in economic flying at the higher altitude.

The apparatus B is also provided with an arrangement by means of which the climbing distance loss applied to the computing circuits is to be switched off when the climbing is completed and the instrument will then show the remaining flying range in level flight on economic fuel consumption at the new higher altitude. As shown on the drawings the arrangement comprises a time relay 45 consisting of a coil 100 and a bimetal spring 101, a relay 102, a condenser 103 connected across the coil of relay 102, and the signal lamp 34. The coil 45 is at one end connected to the D. C. source and to a relay tongue 104 which normally rests on the ratchet wheel 36 and the coil is at its other end connected to a relay tongue 105 of relay 102 and to a relay tongue 106 arranged for cooperation with relay tongue 104. The bimetal spring 101 rests normally on a contact 107 which in turn is connected to one end of the coil of relay 102, the condenser 103, the coil of relay 43 and to signal lamp 34. The relay 102 is provided with a fixed relay tongue 105, and a movable relay tongue 109 which normally rests on the fixed relay tongue 108 and is connected to the other end of the coil of relay 102, condenser 103, the coil of relay 43 and lamp 34, respectively.

When the push button 31 is pushed in, the condenser 103 is charged via relay tongue 109 which starts to move by its relay 102 simultaneously as the relay 43 actuates the switch device 44 and the signal lamp 34 lights. When the relay tongue 109 has moved to contact with the relay tongue 105 of the relay 102 the current will flow through the coil 100 of the time relay 45 whereby the bimetal spring 101 is heated and after a certain lapse of time, e. g., 20 seconds, breaks the contact between relay tongue 101 and 107 with the result that the coils of relay 102 and 43 are de-energized and the lamp 34 extinguishes. The relay tongue 109 moves now back to its resting position and the switch device 44 opens whereby through the action of a spring the sliding contact of the potentiometer 22 is moved back to its zero position and the influence of the potentiometer on the deflection of the indicating instrument ceases. In order to avoid that the time relay 45 causes the switch device 44 to open at a moment when the pilot is turning the shaft 28 the time relay is short circuited through the relay tongues 104 and 106 when the shaft is actuated. The control knob actuating switch 29 of the control apparatus B serves to correct the indicated distance with respect to strong tail or head wind.

The switch 33 is so connected to the apparatus that the sequence in which the control grid 18 of the double triode 19 is switched to the potentiometer 27 and the amplifier valve 17 during the adjustment operation can be reversed. The sequence chosen is indicated by the signal lamp 35.

The intention by this arrangement is to enable the pilot to read the distance during the setting and read the adjusted altitude after the setting. This possibility is of great importance when the pilot is interested in getting information of the longest possible flying range and the altitude for attaining this range, including the loss of distance on account of climbing. When maximum flying range is to be sought the control knob 30 is turned until a maximal deviation is obtained on the indicator C, whereupon reading is done on the distance scale 25. When releasing the control knob 30 the pilot can read on the altitude scale 26 of the indicator C the altitude, at which the airplane has to fly to reach the longest possible flying range.

In carrying out the apparatus according to the embodiment above described and shown in the drawings this can further be automatized and supplemented. Thus the setting of the instrument for existing altitude can be wholly automatically controlled by an altitude sensitive device, as shown in Figs. 5 and 6. This device comprises two aneroid boxes 46 and 47 fixed in two opposite side walls of a casing 48. The pressure sensitive membranes 49 and 50, respectively, of the boxes are united in their centres by means of a steel band 51 which passes through an aperture in a shaft 52 in an S-shaped coil. The turning moment exercised by the steel band 51 upon the shaft 52 is absorbed by a spring, not shown, one end of which is fixed to the shaft and the other end is rotatably mounted in the casing 48, said spring being held stretched by means of a thin piano string or the like. A contact arm 53 is rigidly attached to the shaft 52 and arranged to cooperate with one or the other of two stationary contact pins 54 and 55, one of which is connected to one end and the other pin is connected to the other end of a balanced field winding of an electric motor 56, while the centre of the field winding is connected to a voltage source 57. The rotatably mounted end of the spring is connected to the motor shaft by means of two pulleys 58 and 59 and a rope 60. Via a suitable gearing there is placed on the motor shaft a contact device 61 comprising two contact discs 62 and 63 each having a contact pin 64 and 65, respectively. In the path of each contact pin 64 and 65 there are arranged two stationary countercontact pins 66, 67 and 68, 69 respectively, which are arranged to engage in turn with the contact pins 64 and 65 when the motor shaft is rotating. Each of the stationary contact pins 66 and 69 are connected to a draw magnet 70 and 71 respectively through a relay tongue 72 and 73, respectively, and each of the contact pins 67 and 68 is connected to a relay 74 and 75 respectively. The magnets 70 and 71 are each provided with a spring loaded iron armature 76 and 77 to which is attached an axially aligned rod 78 and 79 having at its outer end a claw 80 and 81, which is arranged to engage tangentially with a toothed wheel 82 and 83 rigidly attached to a shaft 84 to rotate the shaft 84 when the armature 76 and 77 is drawn into its respective magnet 70 and 71. The shaft 84 is axially aligned and connected with shaft 28 by means of a coupling device 85 but the shaft 84 and 28 can be disconnected from each other by pushing in the control knob 30. For this purpose the shaft 28 is here so arranged that it can be axially displaced without changing the position of the means controlled by the shaft. As shown in Fig. 6 the coupling device 85 comprises two clutch rings 86 and 87, one of which is axially slidably mounted on the shaft 84 and has a spring loaded ball 88 and the other ring 87 is slidably but nonrotatably mounted on the shaft 28 and has a hole 89 for receiving the ball 88. The coupling device is normally held in engagement by means of a coil spring 90 mounted around the shaft 84 between the clutch ring 86 and the toothed wheel 82 but the coupling is arranged to be disengaged by means of a distance tube 91 which is rigidly mounted on the inner end of shaft 28 and slidably mounted on the adjacent end of shaft 84 so as to engage with the clutch ring 86. When the control knob 30 is pushed in, the distance tube 91 displaces the clutch ring 86 axially against the action of spring 90, whereby the coupling is released and the shaft 28 can be turned manually by knob 30.

The device above described operates in the following way: When the airplane climbs or descends the pressure sensitive membranes of the aneroid boxes will have a tendency to alter their position, whereby the steel band 51 is slackened or stretched. The contact arm 53 will hereby contact one of the two contact pins 54 and 55 and the motor 56 is started. If the airplane is climbing the motor shaft will evidently rotate in one direction, and if the airplane is descending the motor shaft will rotate in the opposite direction. In dependence of the direction of rotation the motor will thus slacken or tension the spring fixed to the shaft 52, which spring in its turn will have a tendency to turn the contact arm 53 to its neutral position. The contact arm will evidently not be returned to the neutral position before the airplane is in the position of level flight.

Depending on the direction of rotation of the motor the contact discs 62 and 63 attached to the motor shaft will rotate clockwise or anticlockwise. If the contact discs are assumed to rotate clockwise the magnet 70 will get a current impulse each time the contact pin 64 contacts the contact pin 66, but the magnet 71 will not get a current impulse when the contact pin 65 contacts the contact pin 69 due to the fact that immediately before the above mentioned contact has been established the relay 75 has through contact pin 65 and contact pin 68 got a current impulse coefficient to get the relay to operate and thereby through contact 73 cut off the electrical circuit between the magnet 71 and the contact pin 69. Thus at clockwise rotation of the contact discs 62 and 63 only magnet 70 will operate and in a similar manner only magnet 71 will operate at anticlockwise rotation of the contact discs. The magnets 70 and 71 with armatures and claws are so positioned relatively to the shaft 84 and the toothed wheels 82 and 83 that one of the magnets rotates the shaft in one direction and the other magnet rotates the shaft in the other direction. It will thus be seen that if the airplane e. g. is climbing, one of the magnets will rotate the control shaft 28 in a direction corresponding to higher altitude, and if the airplane is descending the other magnet will rotate the control shaft 28 in a direction corresponding to lower altitude.

If the pilot wants information of possible flying range at existing altitude in economic flying he has evidently only to read on the distance scale 25 of the indicator, since the automatic device above described provides the setting of the computing circuits as a function of altitude. If the pilot wants to know possible flying range at an altitude different from the existing one he has to push in and turn the control knob 30 as previously described until he can read the altitude desired on the altitude scale 26 of the indicator, and after that release the control knob 30, whereupon he can read off the flying range on the distance scale. When the control knob 30 is pushed in, the coupling device 85 between shafts 28 and 84 is released and the circuit is closed to the relay 43 through a contact group 92 and 93. In closing the circuit the relay 43 is energized and actuates the switch device 44, whereby the correction disc 42 and the shaft 28 are locked together, and when the control knob 30 is turned, the remaining flying range at the new altitude set is calculated in a manner above described.

If the airplane now is set to climb or descend respectively the shaft 84 is turned by the device above described and when the airplane has reached the flying altitude manually set in the apparatus, the coupling device 85 will again be brought into engagement, and the contact group 92 and 93 opens the circuit to the relay 43 and the correction disc 42 is disconnected. The pilot is now again able to read the remaining flying range at existing altitude.

When the apparatus is to be used in an airplane, which suddenly changes its weight during the flight, e. g. a bomber carrying out bombing, the apparatus ought to be equipped with means which automatically corrects the settings of the adjustment devices for fuel consumption and climb distance losses and descend distance gains with respect to the values of fuel consumption which are valid for level flight, climbing and descending after the change of weight of the airplane.

What I claim as my invention is:

1. Apparatus for computing the distance an airplane can cover by the fuel available in the fuel tanks, comprising means for measuring the fuel quantity of the tanks, means responsive to said fuel measuring means for producing a voltage varying in accordance with the fuel quantity, relay operated computing means variably settable in position corresponding to economic fuel consumption as a function of altitude and responsive to said voltage to produce an output voltage which is a function of the ratio between fuel quantity and economic fuel consumption with respect to altitude, and adjustment means connectable to the computing means to correct said output voltage for the difference in flying range that occurs when the airplane is to be moved in a predetermined way to an altitude different from existing altitude, whereby the flying range can be calculated from existing altitude for flying at different altitudes.

2. Apparatus for computing the distance an airplane can cover by the fuel available in the fuel tanks, comprising means for measuring the fuel quantity of the tanks, means responsive to said fuel measuring means for producing a voltage varying in accordance with the fuel quantity, computing means variably settable in position corresponding to economic fuel consumption as a function of altitude and responsive to said voltage to produce an output voltage which is a function of the ratio between fuel quantity and economic fuel consumption with respect to altitude, and manually settable adjustment means connectable to the computing means to correct said output voltage for the difference in flying range that occurs if the airplane is to be moved in a predetermined way to an altitude different from existing altitude whereby the flying range can be calculated from existing altitude for flying at different altitudes, and means actuated by said adjustment means to set said computing means in a position corresponding to the economic fuel consumption at said different altitude.

3. Apparatus for computing the distance an airplane can cover by fuel available in the fuel tanks, comprising means for measuring the fuel quantity of the tanks, means responsive to said fuel measuring means for producing a voltage varying in accordance with the fuel quantity, computing means variably settable in position corresponding to economic fuel consumption as a function of altitude and responsive to said voltage to produce an output voltage which is a function of the ratio between fuel quantity and economic fuel consumption with respect to altitude, and adjustment means connectable to the computing means to correct said output voltage for the difference in flying range that occurs if the airplane is to be moved in a predetermined way to an altitude different from existing altitude, whereby the flying range can be calculated from existing altitude for flying at different altitudes, and means for automatically disconnecting the adjustment means after a certain lapse of time before the airplane has reached the new altitude.

4. Apparatus for computing the distance an airplane can cover by the fuel available in the fuel tanks of the airplane, comprising means for measuring the fuel quantity of the tanks, means responsive to said fuel measuring means for producing a voltage varying in accordance with the fuel quantity, variably settable computing means calculated on the Mach-number corresponding to economic fuel consumption of the airplane at varying altitudes and responsive to said voltage to produce an output voltage which is a function of the ratio between fuel quantity and economic fuel consumption as a function of Mach-number, and adjustment means connectable to the computing means to correct said output voltage for the difference in flying range that occurs if the airplane is to be moved in a predetermined way to an altitude different from existing altitude, whereby the flying range can be calculated from existing altitude for flying at different altitudes.

5. Apparatus for computing the distance an airplane can cover by the fuel available in the fuel tanks of the airplane, comprising means for measuring the fuel quantity of the tanks, means responsive to said fuel measuring means for producing a voltage varying in accordance with the fuel quantity, computing means variably settable in position corresponding to economic fuel consumption as a function of altitude and responsive to said voltage to produce an output voltage which is a function of the ratio between fuel quantity and economic fuel consumption with respect to altitude, and adjustment means connectable to the computing means to correct said output voltage for the difference in flying range that occurs if the airplane is to be moved in a predetermined way to an altitude different from existing altitude, and indicating means comprising a dial having one scale for indicating flying altitude and another scale for indicating flying distance, and a pointer movable over said scales, altitude calibrated means connected to said computing means, said pointer being selectively connectable with said altitude calibrated means to indicate during adjustment on the altitude scale the altitude for which the computing means has been set and connectable with said adjustment means to indicate flying distance after the adjustment.

6. Apparatus for computing the distance an airplane can cover by the fuel available in the fuel tanks of the airplane, comprising means for measuring the fuel quantity of the tanks, means responsive to said fuel measuring means for producing a voltage varying in accordance with the fuel quantity, computing means variably settable in position corresponding to economic fuel consumption as a function of altitude and responsive to said voltage to produce an output voltage which is a function of the ratio between fuel quantity and economic fuel consumption with respect to altitude, and adjustment means connectable to the computing means to correct said output voltage for the difference in flying range that occurs if the airplane is to be moved in a predetermined way to an altitude different from existing altitude, and indicating means comprising a dial having one scale for indicating flying altitude and another scale for indicating flying distance, and a pointer movable over said scales, altitude calibrated means connected to said computing means and connectable to said indicating means, a switch to selectively connect said pointer to said computing means to indicate during adjustment on the distance scale the longest possible flying range of the airplane and after the adjustment automatically reconnect the pointer to said altitude calibrated means to indicate on the altitude scale the altitude at which the airplane is to be moved to ensure said longest possible flying range.

7. Apparatus for computing the distance an airplane can cover by the fuel available in the fuel tanks of the airplane, comprising means for measuring the fuel quantity of the tanks, means responsive to said fuel measuring means for producing a voltage varying in accordance with the fuel quantity, variably settable computing means calculated on the Mach-number corresponding to economic fuel consumption of the airplane at varying altitudes and responsive to said voltage to produce an output voltage which is a function of the ratio between fuel quantity and economic fuel consumption as a function of Mach-number, and adjustment means connectable to the computing means to correct said output voltage for the difference in flying range that occurs if the airplane is to be moved in a predetermined way to an altitude different from existing altitude, and indicating means comprising a dial having two scales, one of which is graduated in altitude and the other in flying distance and a pointer movable over said scales, altitude calibrated means connected to said computing means and connectable to said indicating means, a switch to selectively connect said pointer to said computing means to indicate during adjustment on the distance scale the longest possible flying range of the airplane and after the adjustment automatically reconnect the pointer to said altitude calibrated means to indicate on the altitude scale the altitude at which the airplane is to be moved to ensure said longest possible flying range.

References Cited in the file of this patent
UNITED STATES PATENTS

| | | |
|---|---|---|
| 2,614,422 | Payne | Oct. 21, 1952 |
| 2,656,977 | Cummings | Oct. 27, 1953 |

OTHER REFERENCES

Electronic Instruments (Greenwood, Holdam and MacRae). Radiation Laboratory Series, vol. 21, published by McGraw-Hill Book Co., New York, N. Y., 1948, page 58, Figure 3.16.